United States Patent [19]

Lowther

[11] Patent Number: 4,483,756
[45] Date of Patent: Nov. 20, 1984

[54] METHOD OF APPLYING ELECTRICAL ENERGY TO A REACTANT CHAMBER

[75] Inventor: Frank E. Lowther, Chatsworth, Calif.

[73] Assignee: Atlantic Richfield Company, Los Angeles, Calif.

[21] Appl. No.: 423,917

[22] Filed: Sep. 27, 1982

[51] Int. Cl.³ .............................................. C04B 35/00
[52] U.S. Cl. .................................... 204/155; 204/164; 204/177; 204/DIG. 11; 252/62.9; 423/362; 423/363; 423/459; 423/DIG. 11
[58] Field of Search .............. 423/362, 363, DIG. 11, 423/459; 252/62.9; 204/155, DIG. 11, 164, 177

[56] References Cited

U.S. PATENT DOCUMENTS

| | | | |
|---|---|---|---|
| 1,108,752 | 8/1914 | Henkel | 423/584 |
| 1,184,839 | 5/1916 | Ellis | 423/362 |
| 1,472,281 | 10/1923 | Page | 204/155 |
| 2,139,969 | 12/1938 | Mills | 204/155 |
| 2,463,109 | 3/1949 | Jaffe | 252/62.9 R X |
| 2,500,008 | 3/1950 | Richardson | 423/363 |
| 3,368,956 | 2/1968 | Yeh | 423/362 X |
| 3,652,699 | 3/1972 | Soderquist et al. | 585/440 |
| 3,774,885 | 11/1973 | Logvinenko et al. | 204/155 |
| 3,829,028 | 8/1974 | Ovcharenko et al. | 204/155 |
| 3,869,251 | 4/1975 | Tsantker et al. | 204/155 |
| 3,880,734 | 4/1975 | Bach | 204/155 |
| 4,038,050 | 7/1977 | Lowther | 55/18 |
| 4,094,652 | 6/1978 | Lowther | 55/33 |
| 4,101,296 | 7/1978 | Lowther | 55/33 |
| 4,163,775 | 8/1979 | Foster et al. | 423/362 |
| 4,338,169 | 6/1982 | Bienvenu | 204/155 |

FOREIGN PATENT DOCUMENTS 537692  3/1977  U.S.S.R. ................ 423/DIG. 11

Primary Examiner—Arthur P. Demers
Attorney, Agent, or Firm—Drude Faulconer

[57] ABSTRACT

A method for applying electrical energy within a reactant chamber to enhance a process being carried out in said chamber. The chamber is filled solely or in part with an electrical energy-producing material which will produce electrical energy when excited. In one embodiment the electrical energy-producing material is a piezoelectric material, e.g. Rochelle salt, which is excited by a stress exerted by a piston within the chamber. In another embodiment, the electrical energy-producing material is a ferroelectric material, e.g. barium titanate, which is excited by an external electrical field applied through an electrode within the chamber. In certain processes, e.g. adsorption, catalysis, etc., the electrical energy-producing material may be mixed with an appropriate process material, e.g. adsorbent, catalyst, etc., to form the bed of material in the chamber.

5 Claims, 3 Drawing Figures

METHOD OF APPLYING ELECTRICAL ENERGY TO A REACTANT CHAMBER

BACKGROUND OF THE INVENTION

The present invention relates to a method of applying electrical energy to a reactant chamber and more particularly relates to a method of applying electrical energy to enhance a chemical or physical process being carried out in a reactant chamber by exciting a material within a reactant chamber to thereby generate said electrical energy.

It has long been known that electrostatic forces play a part in making possible the familiar surface effects involved in many well known surface chemistry and physical processes, e.g. adsorption, absorption, heterogeneous catalysis, surface tension, capillary action, etc. Attempts have been made to modify the electrostatic forces involved in such processes to enhance or improve the processes, themselves.

For example, attempts have been made to modify the electrostatic forces in some of these processes by applying an external electrical field thereto while the process is being carried out. However, in some instances, the amount of electrical power needed to provide an external field of sufficient strength to have any significant effect on the process is so large as to be impractical, if not impossible, with present technology.

One such process is adsorption. As is known, common adsorbents such as fuller's earth, silica gel, charcoal, and molecular sieves take on vast amounts of gases by providing large surface areas in their pores, e.g. 500 square meters of total surface area per one cubic centimeter of bulk volume. The pores in these adsorbents normally consist of cages formed by positive and negative ions (e.g. aluminum, silicon, and oxygen) which in turn form the lattice network of the adsorbent. The dimensions of these cages are on the order of molecular diameters (i.e. angstroms) to tens of molecular diameters. The gas molecule to be adsorbed experiences a "sticking" effect when it strikes a surface within the lattice of the adsorbent due to the unbalanced electrostatic forces on the molecule and is trapped by this sticking effect in the pores of adsorbent.

When electrical energy is applied to the adsorbent while a substance is being adsorbed therein, the electrostatic holding power of the adsorbent is favorably altered to increase the adsorbing capacity of the adsorbent. However, as stated above, simple calculations indicate that it is not practical to apply sufficient electrical energy in the form of an external electrical field to substantially alter adsorbing capacity of the adsorbent. That is, one volt of electricity across 10 angstroms is equivalent to a $10^7$ volts per centimeter field strength. A 100 centimeter long reactant chamber would therefore require $10^9$ volts applied end to end which is not feasible or practical in commercial reactant chambers.

Another example of where the application of an electrical charge to a process can be beneficial is catalysis. While there are many theories involved in catalysis, all recognize that adsorption on the catalyst takes place in order to lock a given molecule (or species) into a fixed position which is favorable for collision with another molecule (or species). The electric field influences the adsorption properties of the catalyst in the same manner as it does with an adsorbent.

SUMMARY OF THE INVENTION

The present invention provides a method for applying electrical energy to a reactant chamber to enhance a process being carried out within said chamber. In accordance with the present invention, an electrical energy-producing material is placed in the chamber which, when excited, will produce or generate electrical energy.

In a first embodiment, this electrical energy-producing material is comprised of a piezoelectric material, e.g. barium titanate, etc., which produces an electrical voltage when excited by a mechanical stress applied thereto. This piezoelectric material may be used solely to fill a reactant chamber or it may be mixed with another process material, e.g. known adsorbents or catalyst, and the resulting mixture then used to fill the reactant chamber; this depending, of course, depending on the process to be carried out. A means, e.g. a piston, is provided within the chamber for applying a mechanical stress to said electric energy-producing material to excite same material to thereby generate a substantial voltage within the reactant chamber while desired reactants are present in the reactant chamber and a desired process, e.g. adsorption, catalysis, etc., is being carried out therein.

In a second embodiment, the electrical energy-producing material is comprised of ferroelectric material, e.g. barium titanate, lead titanate, etc., which is excited by the application of an electric field thereto to thereby induce electrical energy therefrom. Again, this electrical energy-producing material may be used solely to fill a reactant chamber or it may be mixed with another process material, e.g. known adsorbents or catalysts, and the resulting mixture used to fill the reactant chamber; again depending on the actual process to be carried out. A means (e.g. a metallic electrode positioned within the reactant chamber) is provided for applying an external electrical field said electrical energy-producing material to excite same to thereby induce substantial electrical energy within the reactant chamber while desired reactants are present in the reactant chamber and a desired process, e.g. adsorption or catalysis, is being carried out therein.

BRIEF DESCRIPTION OF THE DRAWINGS

The actual operation and apparent advantages of the present invention will be better understood by referring to the drawings in which like numerals identify like parts and in which.

DESCRIPTION OF THE PREFERRED EMBODIMENTS

Figure 1:
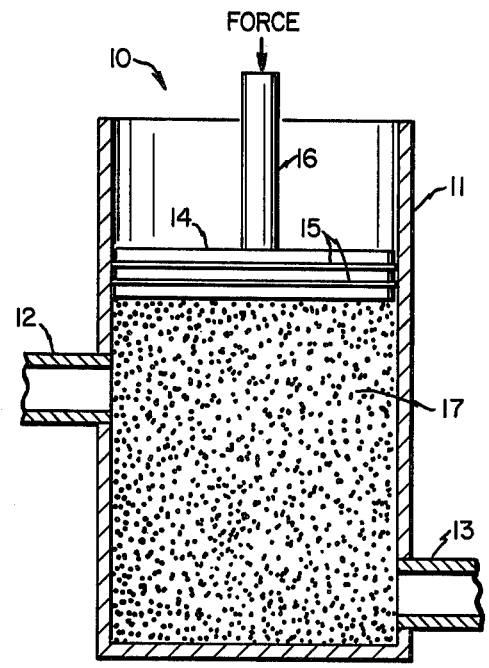
FIG. 1 is an elevational view, partly in section, of a reactant chamber for carrying out a first embodiment of the present invention.

Referring more particularly to the drawings, FIG. 1 discloses a reactant chamber 10 in which a surface chemical or physical process, e.g. adsorption, catalysis, etc., can be carried out. Reactor 10, as illustrated, is comprised of housing 11 having an inlet 12 and an outlet 13. Piston 14 having compression rings 15 thereon is slidably positioned in housing 11 and, as illustrated, and effectively forms the top of reaction chamber 10. Piston 14 is moved by rod 16 which in turn can be actuated by any known power source, e.g. hydraulically (not shown).

Bed 17 in reactant chamber 10 may be comprised entirely of a material which produces electrical energy or electricity when excited or may be such a material mixed with another material as will be explained below. The electrical energy-producing material in bed 17 of FIG. 1 is a piezoelectric material, e.g. barium titanate, potassium sodium tartrate (Rochelle salt), quartz, ammonium dihydrogen phosphate, potassium dihydrogen phosphate, tourmaline, zinc blende, and others. As known, a piezoelectric material, which may occur either as crystals or ceramics or both, is one that produces a voltage when subjected to a mechanical stress.

In a typical process, the desired reactants are flowed into bed 17 through inlet 12 of reactant chamber 10. Piston 14 is actuated to apply a stress force to bed 17 which excites the piezoelectric material in bed 17 to generate electrical energy which, in turn, is applied throughout bed 17 to enhance the process being carried out therein.

The following examples will more specifically illustrate surface chemical and/or physical processes which can be carried out in accordance with the first embodiment of the present invention.

EXAMPLE 1

Figure 2:
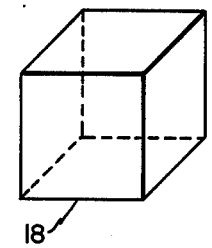
FIG. 2 is an illustration of a typical unit of the material in the reactant chamber of FIG. 1.

Reactant chamber 10 is filled with bed 17 of material comprised of Rochelle salt crystals which are assumed to be cubed shaped (pellet 18 in FIG. 2) and 1 micron ($10^{-4}$ cm.) on each side. The piezoelectric constant of the material in bed 17 is approximately 550 micromicrocoulombs per Newton of force with a dielectric constant of 350 relative to air. Piston 14 is designed to apply a force of 10,000 pounds per sq. in. (psi) to packed bed 17 of access to the initial pressure within the bed. This force on the piezoelectric material is calculated (see below) to produce a resultant electric charge of $0.380 \times 10^{-13}$ coulomb.

$$\text{Force} = 10,000 \frac{\text{pounds}}{\text{sq. inch}} \times 0.16 \times 10^{-9} \text{ sq. inch} \quad (1)$$

$$= 0.16 \times 10^{-4} \text{ pounds} = 0.69 \times 10^{-4} \text{ Newtons}$$

$$Q = 350 \times 10^{-12} \frac{\text{coulomb}}{\text{Newton}} \times 0.69 \times 10^{-4} \text{ Newtons} \quad (2)$$

$$= 0.380 \times 10^{-13} \text{ coulomb}$$

$$C = 0.089 \times 10^{-12} \frac{EA}{t} = \frac{0.089 \times 10^{-12} \times 350 \times 10^{-8}}{10^{-4}} \quad (3)$$

$$= 3.12 \times 10^{-15} \text{ farad}$$

$$V = \frac{Q}{C} = \frac{0.380 \times 10^{-13} \text{ coulomb}}{3.12 \times 10^{-15} \text{ farads}} = 12 \text{ volts} \quad (4)$$

wherein:
Q=Net Electric Charge Produced (coulombs), per per cube
C=Electrical Capacitance of one cube (farad)
E=Dielectric Constant of Material (Relative)
A=Area of Cube Face (sq. cm.)
t=Thickness of Cube (cm.)
V=Potential Produced Per Cube (volts)

The force of the piston will control the amount of gas adsorbed and desolved. Adsorption and desorption times are of the order of a few microseconds to a few milliseconds depending upon pressure, temperature, adsorbents, etc.

It is noted that the thousands of pellets 18 which form bed 17 in reactant chamber 10 are randomly oriented. Therefore the average voltage across the reactant chamber will be zero since as many positively oriented voltages will exist as there are negatively oriented voltages. Nevertheless, sizable voltages are generated across each of the pellets 18 without the appearance of a high total voltage across chamber 10.

To carry out an adsorption process within reactant chamber 10, oxygen is flowed at 1000 atmospheres into bed 17 through inlet 12 of reactant chamber as the force of 10,000 psi in addition to the bed pressure is applied to piston 14 to "squeeze" bed 17 and thereby excite piezoelectric material 18 thereby generating an electrical charge to enhance the adsorption properties of bed 17.

EXAMPLE 2

Reactant chamber 10 is filled with bed 17 of material which is comprised of a catalyst having a piezoelectric material therewith. For example, the material of bed 17 is a heterogenous catalyst consisting of platinum metal formulated in to a 13 X molecular sieve which is reformulated to include Rochelle salt crystals in the molecular sieve binding agent of the catalyst. The Rochelle salt crystals pass a No. 400 mesh sieve (37 microns) and constitute 30 percent by weight of the carrier/catalyst/binder system. The resulting catalyst/piezoelectric material is formed into cylindrical pellets (1/6 inch diameter, 1/6 inch long) and is placed in reactant chamber 10.

Reactants e.g. nitrogen and hydrogen in the ratio of 1 volume to 3 volumes are flowed into bed 17 through inlet 12 of reactant chamber 10 while piston 14 applies forces up to 10,000 pounds per sq. in. on bed 17 over the initial bed pressure to excite the piezoelectric material therein to thereby generate electric energy e.g. in the 1-20 volt range, within chamber 10. The results of this electrical energy in the catalysis process is to speed the formation of 2 volumes of ammonia according to:

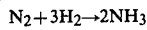

Figure 3:
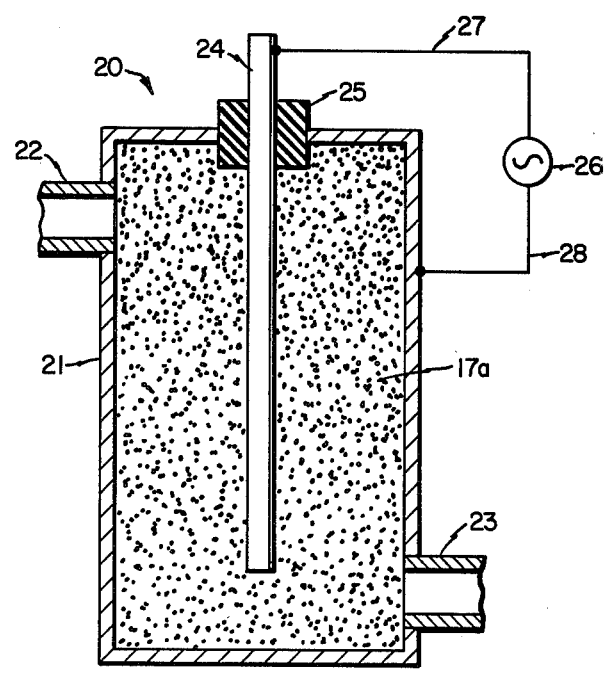
FIG. 3 is an elevational view, partly in section, of a reactant chamber for carrying out a second embodiment of the present invention.

FIG. 3 illustrates reactant chamber 20 which is used to carry out another embodiment of the present invention. Chamber 20 is comprised of a conductive housing 21 having an inlet 22 and an outlet 23. Bed material 17a fills reactant chamber 20 and may be comprised solely of a material which produces electrical energy or electricity when excited or may be comprised of an electrical energy producing material mixed with some other process material, e.g. adsorbent or catalyst. The electrical energy producing material in bed 17a of FIG. 3 is a ferroelectric material, e.g. barium titanate, lead titanate, cadmium titanate, etc. As known a ferroelectric material is one which is polarized in one direction or the other or is reversed in direction by the application of a positive or negative electric field of a certain amount. The material retains the electric polarization unless it is disturbed. The polarization can be sensed by the fact that a change in the electrical field induces an electromotive force which, in turn, causes a current flow.

Metallic electrode 24 extends into housing 21 and is insulated therefrom by non-conductive bushing 25. A voltage source 26 is connected to electrode 24 by lead 27 and to housing 21 by lead 28. Source 26 is illustrated as an alternating current source but may also be direct current, pulsed direct current, or other known sources. Source 26 applies a voltage to electrode 24 which, in turn, applies an electrical field to bed material 17a. The electric field alters the electric charge distribution in the ferroelectric material in bed 17a thereby generating electrical energy to aid in the process being carried out in reactant chamber 20. The following example illustrates a process which can be carried out in accordance with the embodiment of FIG. 3.

EXAMPLE 3

A ferroelectric mixture of crystaline barium titanate and ceramic barium titanate is passed through a No. 400 sieve and is mixed with a 13X molecular sieve to form pellets which, in turn, is used to form bed 17a in reactant chamber 20. An electric field of an average of about 10,000 volts per centimeter is applied from source 26 to bed 17a through electrode 24. Oxygen gas at 3000 atmospheres pressure is admitted into reactant chamber 20 and both inlet 22 and outlet 23 are closed. The electric field is than removed. The amount of oxygen gas adsorbed on the material surface is approximately 20 percent greater than if the electric field had not been applied.

What is claimed is:

1. A method for applying electrical energy within a reactant chamber, said method comprising:
   positioning a piezoelectric material in said reactant chamber which produces electrical energy when excited; and
   applying a stress to said piezoelectric material to thereby apply electrical energy within said reactant chamber.

2. The method of claim 1 wherein said reactant chamber is comprised of a housing having a piston slidably mounted therein and where said step of applying a stress to said piezoelectric material comprises:
   forcing said piston into contact with said piezoelectric material to thereby squeeze said material to produce said electrical energy.

3. A method of applying electrical energy to a substance within a reactant chamber to enhance a process being carried out within said chamber, said method comprising:
   filling said reactant chamber with a process material, at least a part of said process material being comprised of piezoelectric material which produces electrical energy when excited, and
   exciting said piezoelectric material while said substance is in contact with said process material to apply electrical energy thereto to thereby enhance the process being carried out within said reactant chamber.

4. The process of claim 3 wherein said process material comprises:
   an adsorbent material having said piezoelectric material mixed therewith.

5. The process of claim 3 wherein said process material comprises:
   a catalyst having said piezoelectric material mixed therewith.

* * * * *